(12) United States Patent
Schoen et al.

(10) Patent No.: US 10,053,214 B2
(45) Date of Patent: Aug. 21, 2018

(54) LAYER MATERIAL FOR ARRANGING ON A ROTOR BLADE TIP OF A HELICOPTER, HELICOPTER LIGHT SYSTEM, AND HELICOPTER COMPRISING THE SAME

(71) Applicant: Goodrich Lighting Systems GmbH, Lippstadt (DE)

(72) Inventors: Christian Schoen, Mainz (DE); Andre Hessling-Von Heimendahl, Koblenz (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 0 days.

(21) Appl. No.: 15/080,703

(22) Filed: Mar. 25, 2016

(65) Prior Publication Data
US 2016/0280368 A1   Sep. 29, 2016

(30) Foreign Application Priority Data
Mar. 27, 2015  (EP) .................................... 15161373

(51) Int. Cl.
| B64D 47/02 | (2006.01) |
| B64F 1/20 | (2006.01) |
| F21V 1/20 | (2006.01) |
| F21V 21/00 | (2006.01) |
| B64C 27/46 | (2006.01) |
| B64D 47/06 | (2006.01) |
| B64D 47/04 | (2006.01) |
| F21V 7/22 | (2018.01) |
| F21V 9/30 | (2018.01) |

(52) U.S. Cl.
CPC ............ *B64C 27/463* (2013.01); *B64D 47/04* (2013.01); *B64D 47/06* (2013.01); *F21V 7/22* (2013.01); *F21V 9/30* (2018.02); *Y02T 50/53* (2013.01)

(58) Field of Classification Search
CPC . B64C 27/463; F21V 9/16; F21V 7/22; B64D 47/04; B64D 47/06; Y02T 50/53
See application file for complete search history.

(56) References Cited

U.S. PATENT DOCUMENTS

| 3,174,552 | A | * | 3/1965 | Soucy, Jr. | ............... | B64C 27/32 |
| | | | | | | 244/17.11 |
| 3,395,875 | A | * | 8/1968 | Donovan | ............... | B64D 47/06 |
| | | | | | | 244/17.11 |
| 3,723,722 | A | * | 3/1973 | Van Iderstine | ......... | B64C 27/00 |
| | | | | | | 244/17.11 |
| 4,066,890 | A | * | 1/1978 | Hamilton | ............... | B64D 47/06 |
| | | | | | | 340/946 |

(Continued)

FOREIGN PATENT DOCUMENTS

| DE | 202008008517 U1 | 8/2008 | | |
| FR | 2377936 A1 | * | 8/1978 | ............. B64D 47/06 |

OTHER PUBLICATIONS

Extended European Search Report; Application No. 15161373.4-1754; dated Sep. 8, 2015; 7 pages.

*Primary Examiner* — Donald Raleigh
(74) *Attorney, Agent, or Firm* — Cantor Colburn LLP (57) ABSTRACT

In an embodiment, a layer material configured to be arranged on a rotor blade tip of a helicopter comprises at least one light emitting or reflecting section that emits or reflects light after being exposed to a remote light source. The light source can be arranged on the body of the helicopter.

19 Claims, 4 Drawing Sheets

(56) References Cited

U.S. PATENT DOCUMENTS

| | | | | |
|---|---|---|---|---|
| 4,916,581 | A * | 4/1990 | Authier | B64D 47/02 340/946 |
| 5,109,463 | A * | 4/1992 | Lee | G02B 6/4298 385/123 |
| 5,606,637 | A * | 2/1997 | Dolby | F21V 17/04 362/554 |
| 5,671,051 | A * | 9/1997 | Wright, Jr. | B64C 27/008 356/23 |
| 5,793,164 | A * | 8/1998 | Authier | B64D 47/06 315/178 |
| 6,048,172 | A * | 4/2000 | Pniel | B64D 47/06 340/946 |
| 7,324,016 | B1 * | 1/2008 | Milgram | B64C 27/023 244/17.11 |
| 8,253,115 | B1 | 8/2012 | Stevens et al. | |
| 2002/0125368 | A1 * | 9/2002 | Phelps, III | B64C 27/10 244/17.23 |
| 2002/0186921 | A1 * | 12/2002 | Schumacher | G02B 6/0008 385/31 |
| 2004/0009724 | A1 | 1/2004 | Carter et al. | |
| 2005/0007257 | A1 * | 1/2005 | Rast | B64D 47/04 340/815.45 |
| 2006/0188000 | A1 * | 8/2006 | Bird | G01K 11/20 374/161 |
| 2007/0098333 | A1 * | 5/2007 | Gossen | G02B 6/4214 385/89 |
| 2008/0225536 | A1 * | 9/2008 | Landry | B64D 47/06 362/470 |
| 2009/0127386 | A1 | 5/2009 | Cote et al. | |
| 2010/0079729 | A1 * | 4/2010 | Scanlon | G03B 21/00 353/13 |
| 2014/0022641 | A1 | 1/2014 | Yoon | |

\* cited by examiner

LAYER MATERIAL FOR ARRANGING ON A ROTOR BLADE TIP OF A HELICOPTER, HELICOPTER LIGHT SYSTEM, AND HELICOPTER COMPRISING THE SAME

FOREIGN PRIORITY

This application claims priority to European Patent Application No. 15 161 373.4 filed Mar. 27, 2015, the entire contents of which is incorporated herein by reference.

TECHNICAL FIELD

The present invention is in the field of exterior helicopter lighting. In particular, the present invention relates to a layer material configured to be arranged on a rotor blade tip of a helicopter, a helicopter light system for arranging on a helicopter, and a helicopter comprising the same.

BACKGROUND OF THE INVENTION

Most helicopters are equipped with helicopter lights, such as search lights or position lights. Such lights are typically provided somewhere at the helicopter body for illuminating the environment of the helicopter at night, in particular for illuminating the ground close to the helicopter, or for indicating a position and moving direction of the helicopter, respectively.

Nevertheless, the running rotor blades of a helicopter can be dangerous for passengers while boarding, especially at night when the rotor blades are not visible. For night landing in the field and in confined areas, it would be beneficial for the pilot to see the ends of the rotor blade to make sure that the rotor blade is not hitting any obstructions.

The tip of a helicopter rotor blade is the most important zone for the aerodynamics of the helicopter, and forces from acceleration are very high there (up to 1000 G). This makes it very difficult to place light sources there. Moreover, approaches exist in which a light source is placed and powered with electric current in the rotor blade tip, but this is rather complex as any electric wiring is subject to failure. Alternatively there is the opportunity to place energy harvesting means in the vicinity of the tip, but that needs to be coupled with wireless controls (and synchronization when married with a position light functionality).

Accordingly, it would be beneficial to provide a helicopter light system and means therefor that are capable of increasing safety for passengers while boarding or for the pilot while landing, or both, especially at night.

SUMMARY

Exemplary embodiments of the invention include a layer material configured to be arranged on a rotor blade tip of a helicopter, comprising at least one light emitting section that emits light after absorption of photons directed onto the layer material by a remote light source. Particularly, the light emitting section comprises luminescent material. Such luminescent material can provide such effect initiated by photo-excitation (excitation by photons). Time periods between absorption and emission as well as time periods for emission after excitation may vary, and may be adapted to particular circumstances and/or safety requirements.

According to an embodiment, the at least one light emitting section comprises at least one of a phosphorescent material and a fluorescent material.

According to an embodiment, the phosphorescent material comprises a light emission half life of approximately lower than 1 min, preferably lower than 1 s. Preferably, a short discharge time of the phosphorescent material allows a kind of "rotor-tip light effect" to be "switched on and off".

Exemplary embodiments of the invention further include a layer material configured to be arranged on a rotor blade tip of a helicopter comprising at least one light reflecting section that reflects light directed onto the layer material by a remote light source.

Particularly, the at least one light reflecting section comprises at least one of, or a combination of, a diffusely reflecting section and a reflex-reflector section.

For example, a diffusely reflecting section may be employed for outside persons (such as passengers) and a reflex-reflector section may be employed with corresponding light sources in the vicinity of the pilot and/or co-pilot for increased visibility to the pilot and co-pilot in a semi bright environment.

With such layer material according to embodiments of the invention, applied individually or in combination, a means for a helicopter is provided which enables to increase safety for passengers while boarding and/or for the pilot while landing, especially at night or semi-brightness. By means of the layer material emitting and/or reflecting light from the respective rotor blade tip, the rotor blade tip is visually perceivable by passengers or the pilot, even in environments with poor environment light. Particularly, exemplary embodiments of the invention allow for increased safety for passengers while boarding at night, and increased safety for night landing to estimate a clearance between the rotor blade tips and potential obstacles. While safety can be advantageously increased, there is no need for electric wiring whatsoever in the rotor blades, nor the need for any wireless controls. The layer material can be radiated with a remote light source, which does not need to be installed on the rotor blade. The layer material is configured such that visibility of the rotor blade tip can be enhanced. At the same time, the layer material is configured such that the aerodynamics of the helicopter and rotor blades are not influenced by the layer material, and to withstand forces from acceleration at the rotor blade tip.

According to an embodiment, the layer material comprises the form of a strip. Such form is suitable for disposing on the tip of a rotor blade which has an elongate form.

According to a further embodiment, the layer material is configured to be integrated into the rotor blade tip. For example, the layer material can be embedded in a glass-fiber housing, or can be glued onto the rotor blade tip.

According to a further embodiment, a layer material may comprise a combination of at least one light emitting section and at least one light reflecting section, with the light emitting section and light reflecting section having the properties and constitution as set out above. As such, the above advantageous effects can be combined in a layer material, e.g. in a strip of layer material.

Exemplary embodiments of the invention further include a helicopter light system for arranging on a helicopter, comprising at least one layer material according to one of the preceding claims which is configured to be arranged on a side of a rotor blade tip of the helicopter facing the helicopter body, and at least one light source that is configured to be arranged on the helicopter body and to direct light onto the layer material for emitting and/or reflecting visible light by the at least one layer material during rotation of the rotor blade of the helicopter.

According to an embodiment, the at least one layer material and the at least one light source are configured to generate a minimum illuminance (also called luminous emittance) emitted by the at least one layer material in a range of 40 to 200 lx, or a minimum luminance of the at least one layer material in a range of 40 to 200 cd/m². This can be achieved by configuring one or both of the layer material and the at least one light source appropriately, e.g. by providing appropriate luminescent and/or reflecting material for the layer material and/or providing one or more light sources having a corresponding light emission power.

According to an embodiment, the at least one light source comprises at least one first light source configured to be arranged on one of a helicopter main frame and tail of the helicopter body and to emit white light. This provides the advantage that such emitted light may be arranged to be in compliance, and not to interfere, with navigation light according to the FAR (Federal Aviation Requirements) standard, especially FAR § 25.1397, according to which white light is used as navigation or position light indicating a rear position of the helicopter.

According to a further embodiment, the at least one light source comprises at least one second light source and third light source. The second light source is configured to be arranged at a left side of the helicopter body and to emit red light, and the third light source is configured to be arranged at a right side of the helicopter body and to emit green light. This provides the advantage that emitted light may be arranged such that it is in compliance with navigation light according to the FAR standard (FAR § 25.1397). According to this standard, red light is used as navigation light on a front left hand position of the helicopter, and green light is used as navigation light on a front right hand position of the helicopter.

According to an embodiment, the at least one light source is configured to emit white light in a backward direction of the helicopter within a corridor of a tail position light. Advantageously, such white light can be used additionally as navigation light indicating a rear or tail position of the helicopter.

In this respect, whenever it is referred herein to a back, front, left, right position or backward, forward, left, right direction, it shall be understood that these are with respect to the heading direction of the helicopter when flying in forward direction. Further, any references to an upper, lower, top, or bottom side are with respect to the helicopter standing on the ground or flying horizontally.

Exemplary embodiments of the invention further include a helicopter comprising at least one layer material according to embodiments of the invention as described herein arranged on at least one rotor blade tip of the helicopter.

Exemplary embodiments of the invention also include a helicopter comprising at least one helicopter light system according to embodiments of the invention as described herein.

BRIEF DESCRIPTION OF DRAWINGS

Further aspects and exemplary embodiments of the invention are described with respect to the accompanying drawings, wherein.

DETAILED DESCRIPTION OF THE INVENTION

FIGS. 1 to 6 show various layer materials in accordance with exemplary embodiments of the invention. As shown in the embodiments of FIGS. 1 to 6, the layer material is advantageously provided in a strip form, for example having rectangular shape. Other suitable shapes may be trapezoid or triangular. Providing the layer material in a strip form with an elongate extension provides the advantage that it can be well-fitted with the elongate shape of a helicopter rotor blade. In the following description, the layer material may also simply be referred to as "strip", implying that any embodiments disclosed in combination therewith may also be applied in combination with other shapes of the layer material.

As explained in more detail below with respect to FIGS. 7 and 8, when attached to a bottom side of a helicopter rotor blade, and when light from a remote light source is directed onto the layer material or strip attached to the rotor blade, visible light is emitted and/or reflected by the layer material during rotation of the rotor blade of the helicopter depending on the material used.

Figure 1:
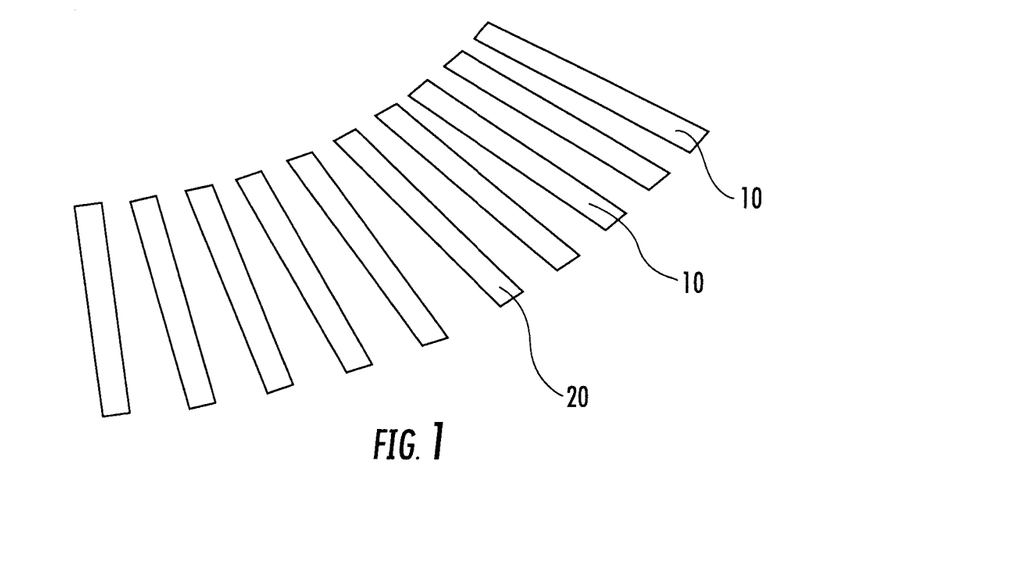
FIG. 1 shows various layer materials in accordance with exemplary embodiments of the invention.
Figure 2:
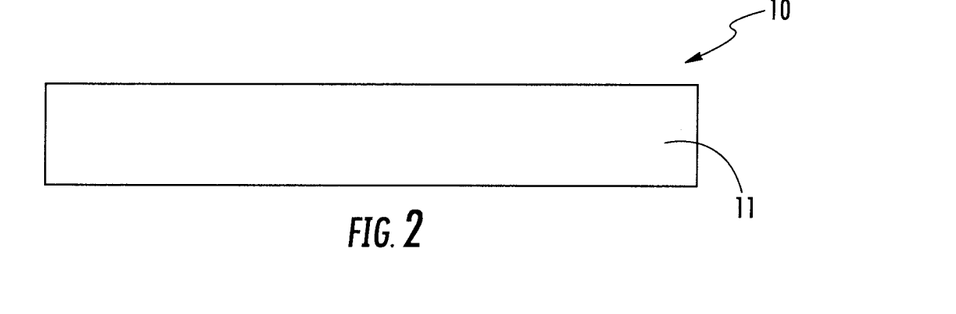
FIG. 2 shows a layer material according to an embodiment of the invention.

FIG. 2 shows a first embodiment of a layer material 10 for arranging on a rotor blade tip of a helicopter, which is also shown in another strip form in FIG. 1. It comprises at least one light emitting section 11 that emits light after absorption of photons directed onto the layer material by a remote light source, as shown in connection with FIGS. 7 and 8. The light emitting section 11 provides or exhibits at least one of many forms of luminescence (light emission) and is initiated by photoexcitation (excitation by photons). Particularly, the light emitting section 11 comprises luminescent material. Following excitation various relaxation processes may occur in which other photons are re-radiated (emitted). Time periods between absorption and emission may vary.

According to an embodiment, the at least one light emitting section 11 comprises at least one of a phosphorescent material and a fluorescent material. Fluorescence resulting from the fluorescent material is a fast process, while typically some amount of the original energy is dissipated so that re-emitted light photons will have lower energy than the absorbed excitation photons. On the other hand, a phosphorescence resulting from the phosphorescent material is typically a slower process involving energy state transfer sometimes lasting several seconds or minutes or hours. This typically results in a "glow in the dark" effect.

According to an embodiment of the invention, a phosphorescent material is used which comprises a light emission half-life (or half-value period, or discharging mean time) of approximately lower than 1 minute, preferably lower than 1 second. Preferably, a short discharge time of the phosphorescent material allows a kind of "switching on and off" of the light emission by the layer material.

Figure 3:
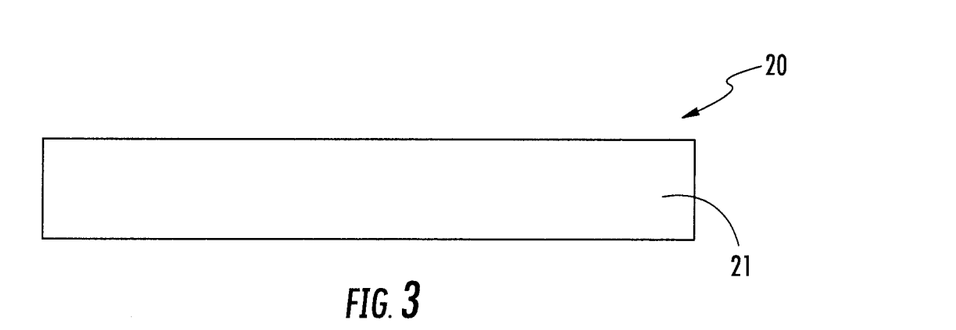
FIG. 3 shows a layer material according to a further embodiment of the invention.

FIG. 3 shows another embodiment of a layer material 20 for arranging on a rotor blade tip of a helicopter, which is also shown in another strip form in FIG. 1. It comprises at least one light reflecting section 21 that reflects light directed onto the layer material by a remote light source, as shown in connection with FIGS. 7 and 8.

According to an embodiment, the light reflecting section 21 is a diffusely reflecting section. For example, a diffusely reflecting section may be employed to achieve increased visibility of the rotor blade tips for outside persons (such as passengers). According to another embodiment, the light reflecting section 21 is a reflex-reflector section. A reflex-reflector section may be employed with corresponding light sources in the vicinity of the pilot and/or co-pilot for maximum visibility of the rotor blade tips for the pilot and co-pilot.

Figure 4:
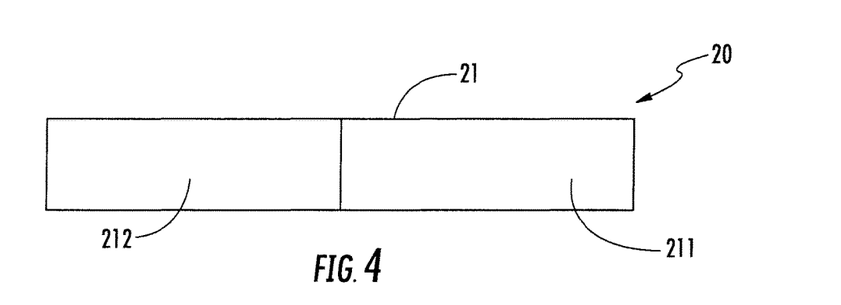
FIG. 4 shows a layer material according to a further embodiment of the invention.

According to another embodiment, as shown in FIG. 4, the light reflecting section 21 of the layer material 20 comprises a combination of a diffusely reflecting section 211 and a reflex-reflector section 212. In such implementation, the above described effects may combined in a layer material, e.g. in one strip.

Figure 5:
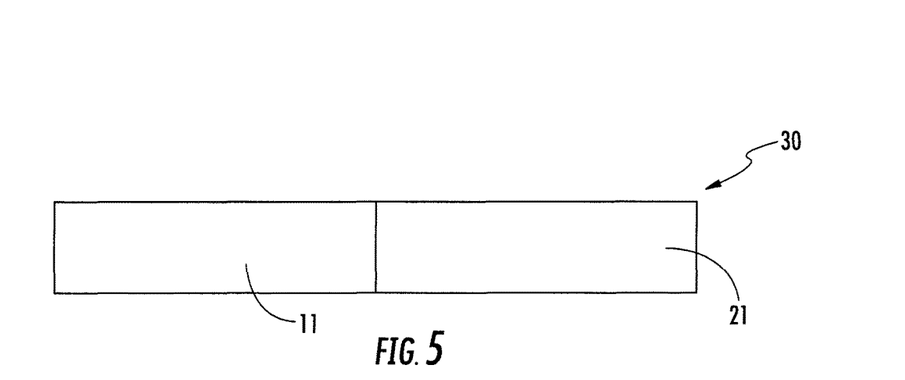
FIG. 5 shows a layer material according to a further embodiment of the invention.

FIG. 5 shows an embodiment of the invention, in which a light emitting section 11, such as explained with respect to FIG. 2, and a light reflecting section 21, such as explained with respect to FIG. 3, are combined in a layer material 30, e.g. in one strip. For example, a phosphorescent material in section 11 may be combined with a light reflecting section 21, such as a reflex-reflector section. This provides the advantage that, in case that luminance of the phosphorescent material in section 11 does not suffice to fulfil any requirements for increased visibility, the overall luminance of the layer material 30 may be increased by the light reflecting section 21, e.g. by a reflex-reflector section. For example, the latter may be adapted for the pilot and/or co-pilot.

Instead of or in addition to a phosphorescent material, a fluorescent material may be used, for example, in case that a higher luminance in light emitting section 11 should be achieved, which can hardly be achieved with phosphorescent material alone. Further, fluorescent material may result in a better visibility at night than phosphorescent material, which provides increased safety for service personnel approaching the helicopter.

Figure 6:
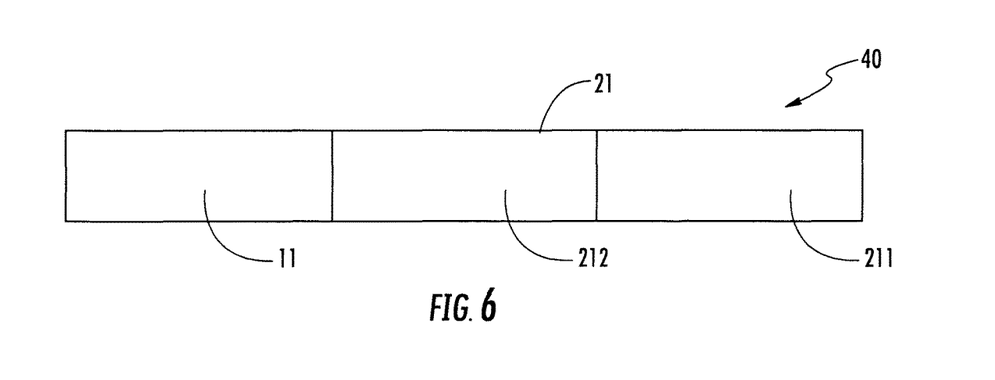
FIG. 6 shows a layer material according to a further embodiment of the invention.

FIG. 6 shows an embodiment of the invention, in which a light emitting section 11, such as explained with respect to FIG. 2, and a light reflecting section 21, such as explained with respect to FIG. 4, are combined in a layer material 40, e.g. in one strip. Accordingly, the layer material 40 comprises at least three sections, i.e. a light emitting section 11 (e.g. with phosphorescent material), a diffusely reflecting section 211, and a reflex-reflector section 212. Any sequence of arrangement of the sections along the strip may be made according to the respective demands. Further, it is also possible to arrange the sections 11, 21, 211 and/or 212 side by side to each other, for example if the rotor blade has sufficient width for arranging a corresponding strip. In principle, any combination of geometrically arranging the sections 11, 21, 211 and 212 may be taken into account depending on the particular demands and circumstances.

For example, the layer material is integrated into the rotor blade tip, for instance embedded in a glass-fiber housing. This may be similar to known formation lights or similar to known low level floor path marking lights. According to another embodiment, the layer material may be glued onto the rotor blade tip, e.g. using appropriate glue to withstand the temperature changes, harsh environmental conditions and high acceleration forces when applied on the rotor blade tip.

Figure 7:
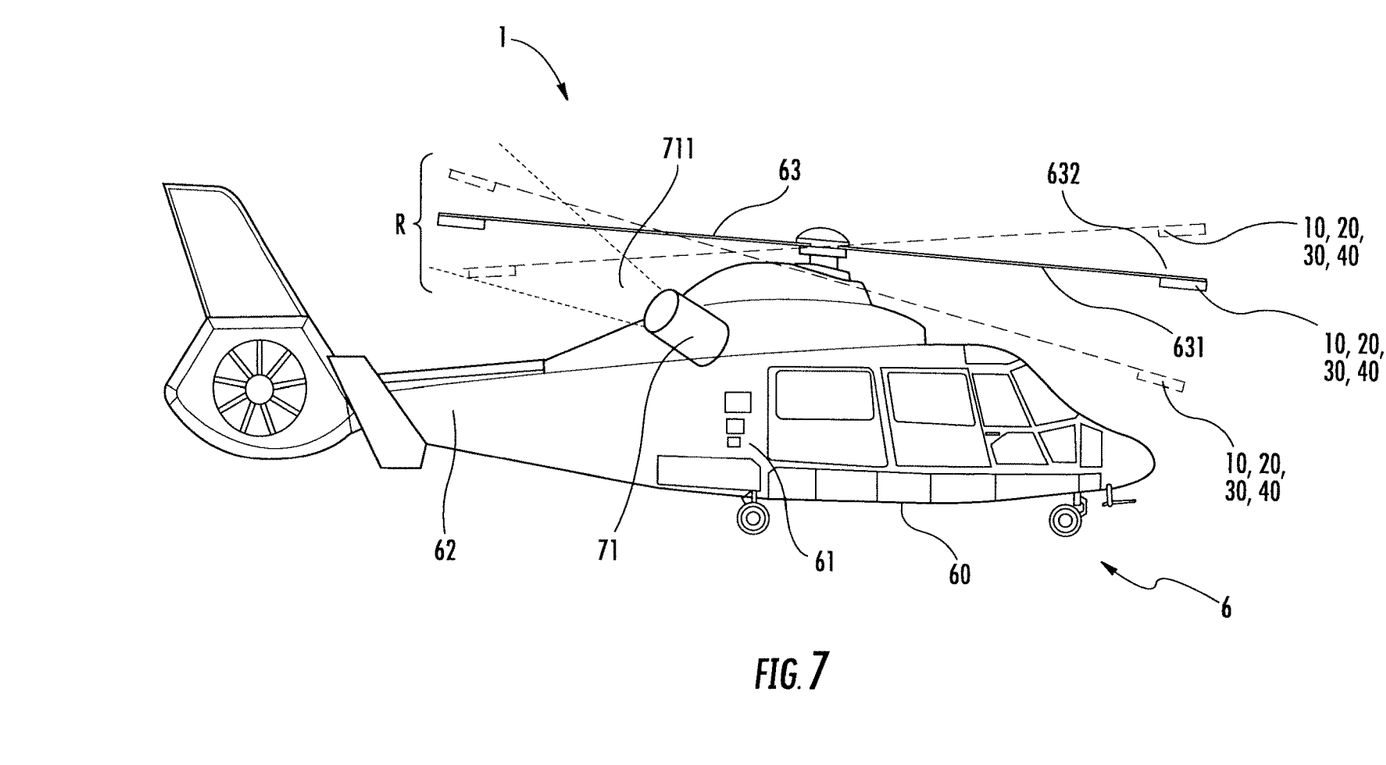
FIG. 7 shows a helicopter with a helicopter light system in accordance with an exemplary embodiment of the invention.

FIG. 7 shows a helicopter 6 comprising a helicopter light system 1 in accordance with an exemplary embodiment of the invention. Like in FIG. 8, the sizes of the layer material and light sources as shown are increased and not to scale. The helicopter 6 comprises a helicopter body 60, which comprises a main frame 61 and a tail 62, as commonly known. Further, the helicopter 6 comprises one or multiple rotor blades 63 (often also simply called rotor), which generate the ascending force for take off. The rotor blade position may change depending on operation conditions of the helicopter, e.g. within a range R indicating a range of the rotor blade position. A rotor blade 63 has tips (called herein rotor tips or rotor blade tips) 632 at both of its ends, wherein a layer material (e.g. in the form of a strip), such as 10, 20, 30, and/or 40 as described above, may be arranged at only one rotor tip or at both rotor tips of a rotor blade. Particularly, the layer material is arranged on a side 631 of a rotor blade tip 632 facing the helicopter body 60, which side 631 is a bottom side of the rotor blade 63.

Arranging the layer material, such as 10, 20, 30, 40, on a rotor blade tip shall be understood as encompassing any position at or near one of the ends of the respective rotor blade. For example, the layer material may be arranged such that the outer edge of the layer material approximately conforms with the outer edge of the rotor blade, or is at a short distance from the outer edge of the rotor blade, e.g. at a distance around 0.5 m or less.

According to an embodiment, the layer material, e.g. in the form of a strip, has a length of approximately between 5 and 30 cm. Greater or smaller lengths are possible. Particularly, the length is along the elongation of the respective rotor blade to which the layer material is attached.

The helicopter light system 1 employed on the helicopter 6 further comprises at least one light source emitting light 711. In the embodiment of FIG. 7, the helicopter light system 1 comprises a light source 71 shown schematically in FIG. 7.

Generally, the at least one light source is arranged on the helicopter body 60 in any suitable manner, e.g. mounted or integrated on the top side of the helicopter body 60, such as on the helicopter roof. It may comprise any appropriate lighting device, such as a light bulb, LED, or OLED in any appropriate number, which is capable of generating light in appropriate color and of sufficient lighting power to be directed onto the layer material for sufficient light emission and/or reflection by the layer material.

The color of the at least one light source is selected such that visible light is emitted and/or reflected by the at least one layer material during rotation of the rotor blade 63 of the helicopter. For example, the at least one light source is a light source emitting bluish white or UV light. These advantageously have a quite high radiation energy resulting from their short wavelengths. As a result of the red-shifting of the emitted and/or reflected light in the layer material, visible light of greater wavelength may be emitted/reflected by the layer material.

According to an embodiment, the layer material 10, 20, 30, 40 and the at least one light source (in FIG. 7, the light source 71) are configured to generate a minimum illuminance emitted by the layer material in a range of 40 to 200 lx, or a minimum luminance of the layer material in a range of 40 to 200 cd/m$^2$.

Generally, the light source 71 in FIG. 7 can be arranged on the helicopter main frame 61 (as shown), and/or on the tail 62 of the helicopter body 60. In the latter position, the light source may emit light in vertical direction onto the layer material (as also shown in FIG. 8 with light source 72). Preferably, the light source 71 emits white light 711, so that it complies in color with any navigation lights on the rear position according to FAR § 25.1397. Particularly, the light source 71 emits white light 711 in a backward direction of the helicopter 6 within a corridor of a tail position or navigation light.

According to an embodiment, the light source 71 emits light at a particular angle with respect to a horizontal plane. For example, the angle is in compliance with an angle specified for a navigation light. According to an embodiment, the angle with respect to a horizontal plane is in a range between 5° and 45°. According to an embodiment, angles with respect to a horizontal plane in a range between 5° and 90° are possible.

Figure 8:
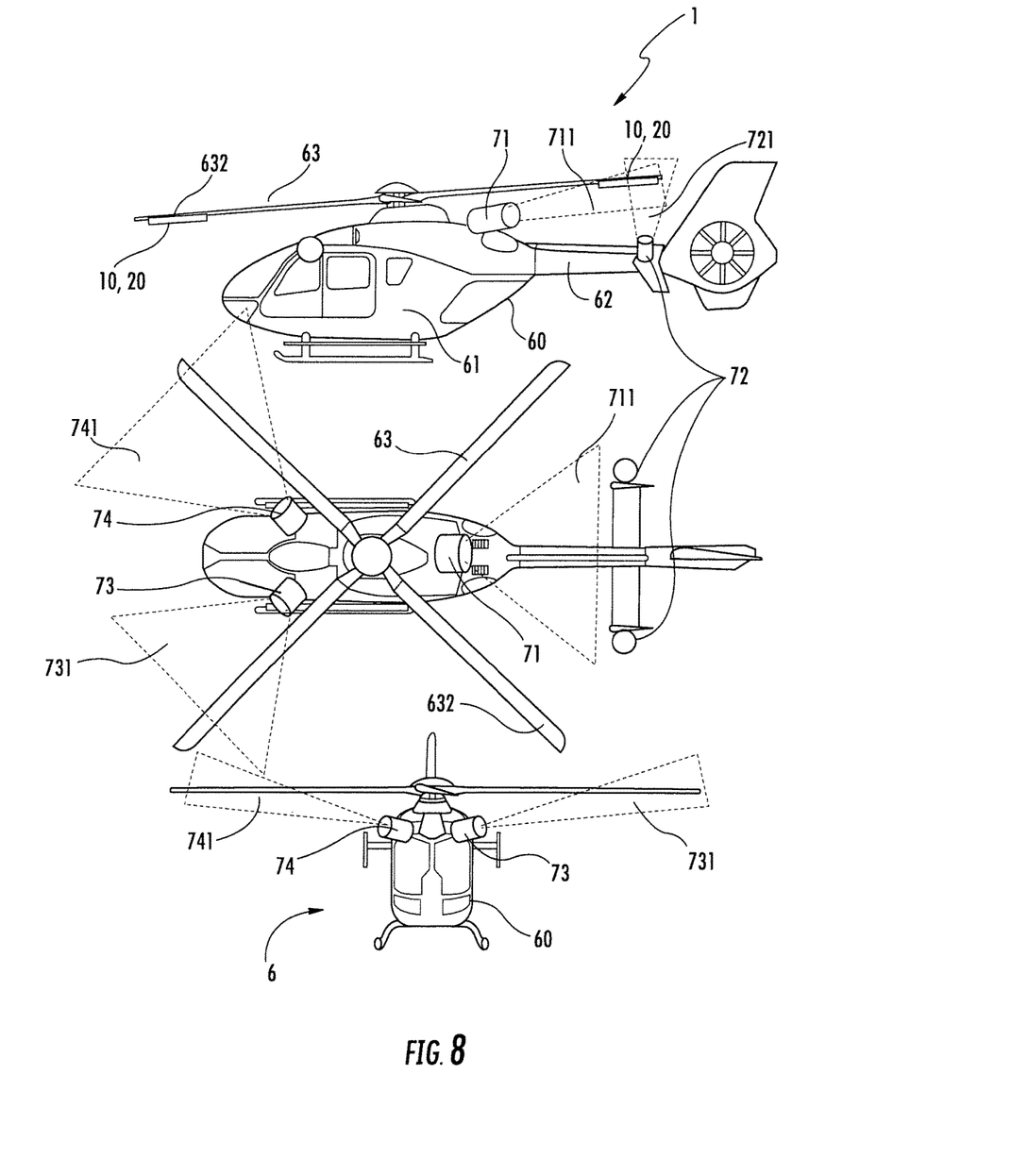
FIG. 8 shows a helicopter with a helicopter light system in accordance with a further exemplary embodiment of the invention in a side view, top view and front view.

FIG. 8 shows another helicopter 6 with a helicopter light system 1 in accordance with another exemplary embodiment of the invention. The depiction of FIG. 8 comprises a side view, a top view and a front view. Same or corresponding parts of the helicopter and light system are designated with same reference numerals as in FIG. 7 and will not be explained again for reasons of brevity.

The helicopter light system 1 according to FIG. 8 comprises at least one first light source, which may comprise a light source 71 and/or a light source 72. The light sources 71 and 72 may be employed in combination or alternatively to each other. The light source 71 emits light at a particular angle with respect to the horizontal plane and is arranged on the helicopter main frame 61, like in the embodiment of FIG. 7. The light source 72 is arranged on the tail 62 of the helicopter body 60 and may comprise one or more lighting devices, e.g. two distributed lighting devices at respective ends of a horizontal tail as shown in the top view of FIG. 8. The light source 72 emits light in approximately vertical direction. Preferably, the light sources 71, 72 emit white light 711, 721 for "charging" a light emitting section 11 of a layer material arranged on a rotor blade tip, e.g. having a fluorescent and/or phosphorescent material. For example, a charge duration may be 1/100 s.

The helicopter light system 1 according to FIG. 8 further comprises a second light source 73 and a third light source 74. The light source 73 is arranged at a left side of the helicopter body 60 and emits red light 731. The light source 74 is arranged at a right side of the helicopter body 60 and emits green light 741. This provides the advantage that emitted light may be in compliance with navigation light according to FAR § 25.1397 requirements. According to this standard, red light is used as left hand navigation light of the helicopter, and green light is used as right hand navigation light of the helicopter. Such embodiment may especially be employed during hover, wherein the light sources can be illuminated red and green in the corridor of the position light sectors.

In the embodiment of FIG. 8, the layer material arranged on the rotor blade tip preferably includes a light reflecting section 21 which reflects the light 731 and 741 emitted by light sources 73 and 74. Thus, light reflection from the rotor blade tips can be provided in the vicinity of the pilot and/or co-pilot for increased visibility of the rotor blade tips to the pilot and co-pilot in a semi bright environment. Since the intensity of the light decreases after reflection and light is diffused in multiple directions, there is only low, if any, disturbance of the navigation light sectors.

Thus, the embodiment according to FIG. 8 advantageously increases safety for passengers or service personnel on the ground with providing and "charging" the light emitting section of the layer material, and for the pilot or co-pilot while landing with providing the light reflecting section of the layer material reflecting the light of light sources placed in the vicinity of the pilot and co-pilot.

Thus, according to embodiments of the invention, a semi-passive rotor tip light in the form of a strip can be integrated into or glued on the rotor tip. Such strip may include a phosphorescent or fluorescent section. Other sections may include a diffusely reflecting section for outside persons and/or a reflex-reflector section with corresponding lights in the vicinity of the pilot/co-pilot for increased visibility to pilot and co-pilot in semi-bright environment.

Instead of having an active light source in the rotor blade (such as a light bulb, LED, OLED, electroluminescence-stripes, etc.), a passive element with a layer material like phosphorescent material can be used. Such an element can be "charged" with light and recharge slowly by glowing for a view seconds up to some minutes, depending on the material. A light source can be placed on the body of the helicopter to activate and charge the element. For a good efficiency the elements can be illuminated with UV light or bluish light. However, since UV-light might cause some safety issues and blue light might be in conflict with the lights distribution and color of position lights, a backward directed white light that stays within the corridor of the tail position light may be preferred in some applications.

While boarding especially the area above and/or in front of the helicopter doors are of interest. According to an embodiment, these areas could be illuminated during the time when the light sources illuminate the layer material. A (reflex-) reflective layer material at the rotor blade tips can increase the luminosity and hence the visibility. As long as the helicopter is on the ground there is no conflict with any position lights.

According to a further embodiment, the light sources can be operated in a strobe mode, e.g. synchronously to the rotation frequency of the rotor blades. This may be advantageous for saving energy.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

The invention claimed is:

1. A helicopter rotor blade comprising:
   a rotor blade tip; and
   a layer material arranged on the rotor blade tip that includes at least one light reflecting section that reflects light directed onto the layer material by a remote light source,
   wherein the at least one light reflecting section comprises at least one of, or a combination of, a diffusely reflecting section and a reflex-reflector section,
   wherein the layer material is integrated into the rotor blade tip in a glass-fiber housing.

2. The rotor blade of claim 1, wherein the layer material comprises at least one light emitting section comprising at least one of a phosphorescent material and a fluorescent material.

3. A helicopter light system for arranging on a helicopter, comprising:
- at least one layer material configured to be arranged on a side of a rotor blade tip of the helicopter facing the helicopter body, and
- at least one light source that is configured to be arranged on the helicopter body and to direct light onto the layer material for reflecting visible light by the at least one layer material during rotation of the rotor blade of the helicopter,
- wherein the at least one layer material is embedded in a glass-fiber housing on the rotor blade tip.

4. The helicopter light system according to claim 3, wherein the at least one layer material and the at least one light source are configured to generate a minimum illuminance emitted by the at least one layer material in a range of 40 to 200 lx, or a minimum luminance of the at least one layer material in a range of 40 to 200 cd/m².

5. The helicopter light system according to claim 3, wherein the at least one light source comprises at least one first light source configured to be arranged on one of a helicopter main frame and tail of the helicopter body and to emit white light.

6. The helicopter light system according to claim 3, wherein
- the at least one light source comprises at least one second light source and third light source,
- the at least one second light source is configured to be arranged at a left side of the helicopter body and to emit red light, and
- the at least one third light source is configured to be arranged at a right side of the helicopter body and to emit green light.

7. The helicopter light system according to claim 3, wherein the at least one layer material comprises at least one of, or a combination of, a diffusely reflecting section and a reflex-reflector section.

8. The helicopter light system according to claim 3, wherein the at least one layer material comprises the form of a strip.

9. The helicopter light system according to claim 3, wherein the at least one layer material comprises at least one light emitting section comprising at least one of a phosphorescent material and a fluorescent material.

10. A helicopter light system for arranging on a helicopter, comprising:
- at least one layer material configured to be arranged on a side of a rotor blade tip of the helicopter facing the helicopter body, and
- at least one light source that is configured to be arranged on the helicopter body and to direct light onto the layer material for emitting visible light by the at least one layer material during rotation of the rotor blade of the helicopter.

11. The helicopter light system according to claim 10, wherein the at least one layer material and the at least one light source are configured to generate a minimum illuminance emitted by the at least one layer material in a range of 40 to 200 lx, or a minimum luminance of the at least one layer material in a range of 40 to 200 cd/m².

12. The helicopter light system according to claim 10, wherein the at least one light source comprises at least one first light source configured to be arranged on one of a helicopter main frame and tail of the helicopter body and to emit white light.

13. The helicopter light system according to claim 10, wherein
- the at least one light source comprises at least one second light source and third light source,
- the at least one second light source is configured to be arranged at a left side of the helicopter body and to emit red light, and
- the at least one third light source is configured to be arranged at a right side of the helicopter body and to emit green light.

14. The helicopter light system according to claim 10, wherein the at least one layer material comprises at least one of a phosphorescent material and a fluorescent material.

15. The helicopter light system according to claim 10, wherein the at least one layer material comprises a phosphorescent material that comprises a light emission half-life of approximately lower than 1 minute.

16. The helicopter light system according to claim 10, wherein the at least one layer material comprises the form of a strip.

17. The helicopter light system according to claim 10, wherein the at least one layer material is embedded in a glass-fiber housing on the rotor blade tip.

18. The helicopter light system according to claim 10, wherein the at least one layer material comprises at least one light reflecting section that reflects light directed onto the at least one layer material by the at least one light source.

19. The helicopter light system according to claim 10, wherein the at least one layer material comprises a phosphorescent material that comprises a light emission half-life of approximately lower than 1 second.

* * * * *